(12) United States Patent
Sanchez et al.

(10) Patent No.: US 11,877,055 B2
(45) Date of Patent: Jan. 16, 2024

(54) SYSTEM AND METHOD TO OPERATE A SET REMOTELY

(71) Applicant: DISNEY ENTERPRISES, INC., Burbank, CA (US)

(72) Inventors: Rene A. Sanchez, Glendora, CA (US); Lawrence Anthony, Los Angeles, CA (US); Eddie F. Rodriguez, Jr., Covina, CA (US); Robert W. Schefferine, Thousand Oaks, CA (US); Anthony J. Ybarra, Fontana, CA (US)

(73) Assignee: Disney Enterprises, Inc., Burbank, CA (US)

( * ) Notice: Subject to any disclaimer, the term of this patent is extended or adjusted under 35 U.S.C. 154(b) by 34 days.

(21) Appl. No.: 17/531,656

(22) Filed: Nov. 19, 2021

(65) Prior Publication Data

US 2022/0086329 A1 Mar. 17, 2022

Related U.S. Application Data

(63) Continuation of application No. 16/926,046, filed on Jul. 10, 2020, now Pat. No. 11,201,995.

(51) Int. Cl.
*H04N 23/661* (2023.01)
*H04N 23/60* (2023.01)
*H04N 23/69* (2023.01)
*H04N 23/695* (2023.01)

(52) U.S. Cl.
CPC .......... *H04N 23/661* (2023.01); *H04N 23/64* (2023.01); *H04N 23/69* (2023.01); *H04N 23/695* (2023.01)

(58) Field of Classification Search
CPC .......... H04N 5/23206; H04N 5/23299; H04N 5/23222; H04N 5/23296
USPC ...................................... 348/207.1
See application file for complete search history.

(56) References Cited

U.S. PATENT DOCUMENTS

| 9,654,563 | B2 | 5/2017 | Shoemake et al. |
| 9,798,933 | B1 | 10/2017 | Meisser et al. |
| 9,992,399 | B2 | 6/2018 | Carr |
| 10,453,496 | B2 * | 10/2019 | Newell ............. H04N 5/445 |
| 10,582,130 | B1 | 3/2020 | Yu |
| 10,686,984 | B1 | 6/2020 | Schmidt et al. |
| 10,783,925 | B2 * | 9/2020 | Newell ........... H04N 21/435 |
| 10,979,674 | B2 | 4/2021 | Nathan et al. |
| 11,107,503 | B2 * | 8/2021 | Wu .................. G06F 3/0484 |

(Continued)

*Primary Examiner* — Pritham D Prabhakher
(74) *Attorney, Agent, or Firm* — Dorsey & Whitney LLP

(57) ABSTRACT

The present disclosure describes systems and methods operating a set remotely, and more specifically, for enabling the control of a remotely adjustable audio-visual recording device as well as the communication between the remotely adjustable audio-visual recording device and various specialty devices of a cloud control center configured to remotely control features of the remotely adjustable audio-visual recording device. In operation, a talent component may receive a user input indicative of turning on the r remotely adjustable audio-visual recording device. Based on receiving the user input, the talent component may automatically connect, via a network, to a cloud control center. Based on connecting to the talent component, the cloud control center may remotely control the remotely adjustable audio-visual recording device an enable the remote recording of audio-visual content.

21 Claims, 5 Drawing Sheets

(56) References Cited

U.S. PATENT DOCUMENTS

| | | |
|---|---|---|
| 2003/0169329 A1* | 9/2003 | Parker ............... H04N 7/15 348/E7.083 |
| 2014/0168453 A1 | 6/2014 | Shoemake et al. |
| 2014/0313341 A1 | 10/2014 | Stribling |
| 2015/0022666 A1 | 1/2015 | Kay et al. |
| 2015/0130801 A1* | 5/2015 | Wooley ............. H04N 5/2628 345/420 |
| 2015/0244807 A1 | 8/2015 | Shoemake et al. |
| 2017/0214842 A1* | 7/2017 | Carr ................... H04N 23/90 |
| 2017/0264822 A1 | 9/2017 | Shen et al. |
| 2018/0165520 A1 | 6/2018 | Meisser et al. |
| 2018/0310037 A1* | 10/2018 | Pizzurro ......... H04N 21/23412 |
| 2018/0352253 A1 | 12/2018 | Shen et al. |
| 2019/0141223 A1* | 5/2019 | Van de Roer ......... H04N 23/56 |
| 2019/0206439 A1* | 7/2019 | Newell ................. G11B 27/10 |
| 2019/0208287 A1* | 7/2019 | Newell ............. H04N 21/4223 |
| 2020/0126545 A1 | 4/2020 | Kakkar et al. |
| 2020/0137354 A1 | 4/2020 | Nathan et al. |
| 2021/0006706 A1 | 1/2021 | Koci |
| 2021/0104260 A1* | 4/2021 | Wu ..................... G11B 27/031 |

* cited by examiner

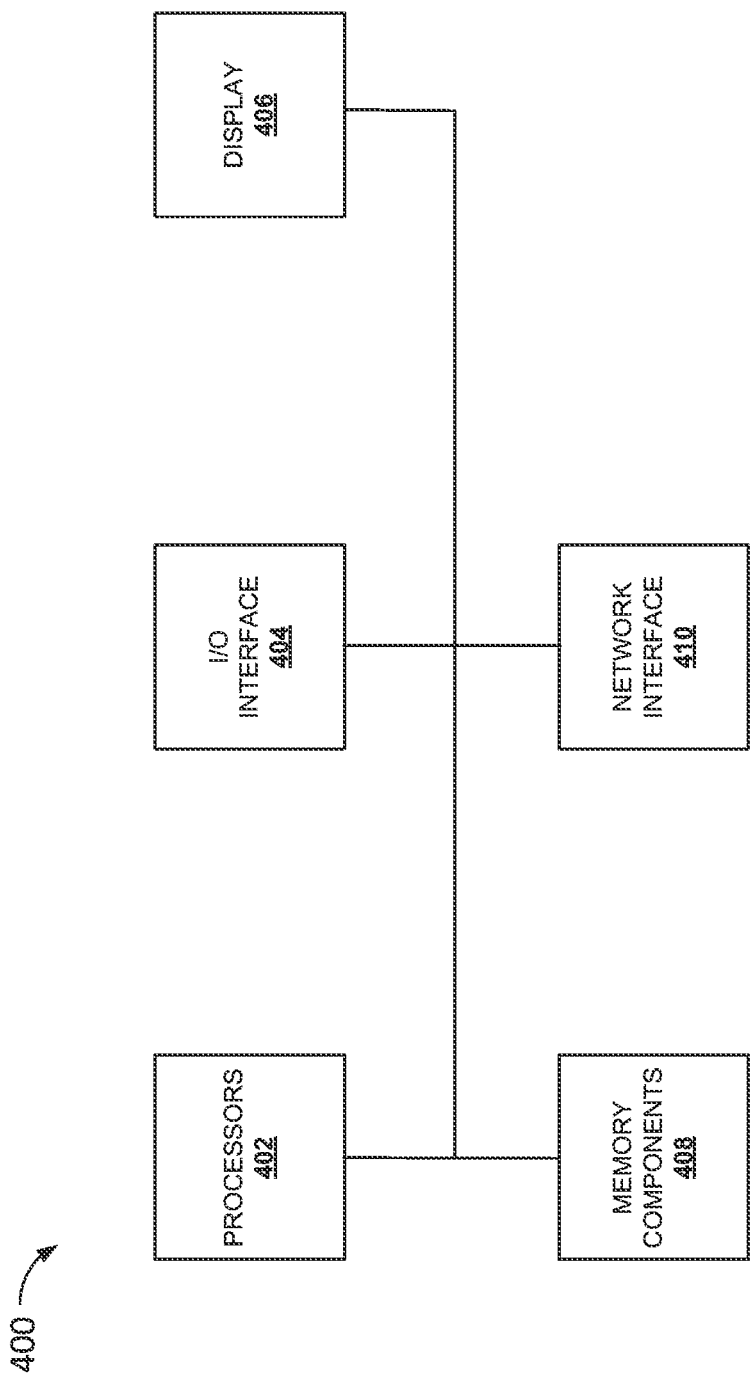

SYSTEM AND METHOD TO OPERATE A SET REMOTELY

CROSS-REFERENCE TO RELATED APPLICATIONS

This application is a continuation application of U.S. patent application Ser. No. 16/926,046 filed Jul. 10, 2020, entitled "SYSTEM AND METHOD TO OPERATE A SET REMOTELY", the entire disclosure of which is incorporated herein in its entirety by reference.

FIELD

Examples described herein generally relate to remote media production, and more specifically, to a remotely controlled adjustable audio-visual recording device communicatively coupled to various specialty devices of a cloud control center configured to remotely control features of the adjustable audio-visual recording device.

BACKGROUND

Media production is the generation of audio and/or visual content, such as a newscast, documentary, Internet video, interview, movie, television show, or other viewable media. Such generated content may be transmitted to viewers through various methods, such as broadcast audio waves, cable, satellite, wireless, or the Internet. Traditionally, a media production company includes specialized crew members, such as electricians, camera operators, the director of photography, grips, gaffers, operators, and the like, that are each responsible for various elements of a production project, from set design and lighting, to camera control and recording. For the best quality content, oftentimes content generation occurs on-set and in-person with the help of specialized media production crew members. As media production migrates from the traditional controlled production set with a large, specialized crew to remote locations with no production crew, the quality of the content generated may be compromised.

SUMMARY

Embodiments relate to systems and methods for operating a set remotely, and more specifically, for enabling the control of a remotely adjustable audio-visual recording device as well as the communication between the remotely adjustable audio-visual recording device and various specialty devices of a cloud control center configured to remotely control features of the remotely adjustable audio-visual recording device.

In operation, a talent component comprising a remotely adjustable audio-visual recording device receives a user input indicative of turning on the remotely adjustable audio-visual recording device and, based on receiving the user input, automatically connect, via a network, to a cloud control center.

The cloud component comprising a plurality of specialty devices, each of the plurality of specialty devices configured to present information and enable control of features corresponding to a recording of audio-visual content captured by the talent component and relevant to a corresponding specialty device, is configured to control the remotely adjustable audio-visual recording devices based at least on connecting to the talent component. In some examples, the cloud computing component is further configured to, based on determining the remotely adjustable audio-visual recording device is in a location satisfying at least one condition, begin the recording of the audio-visual content.

In some examples, the plurality of specialty devices comprises a director computing device, a digital image technician computing device, a director of photography computing device, a director computing device, or combinations thereof, each configured to display information and/or control one or more features of the remotely adjustable audio-visual recording device.

In addition to the exemplary aspects and embodiments described above, further aspects and embodiments will become apparent by reference to the drawings and by study of the following description.

BRIEF DESCRIPTION OF THE DRAWINGS

Reference is now made to the following descriptions taken in conjunction with the accompanying drawings, in which:

FIG. 4 illustrates an example computing system, in accordance with examples described herein.

SPECIFICATION

Figure 1A:
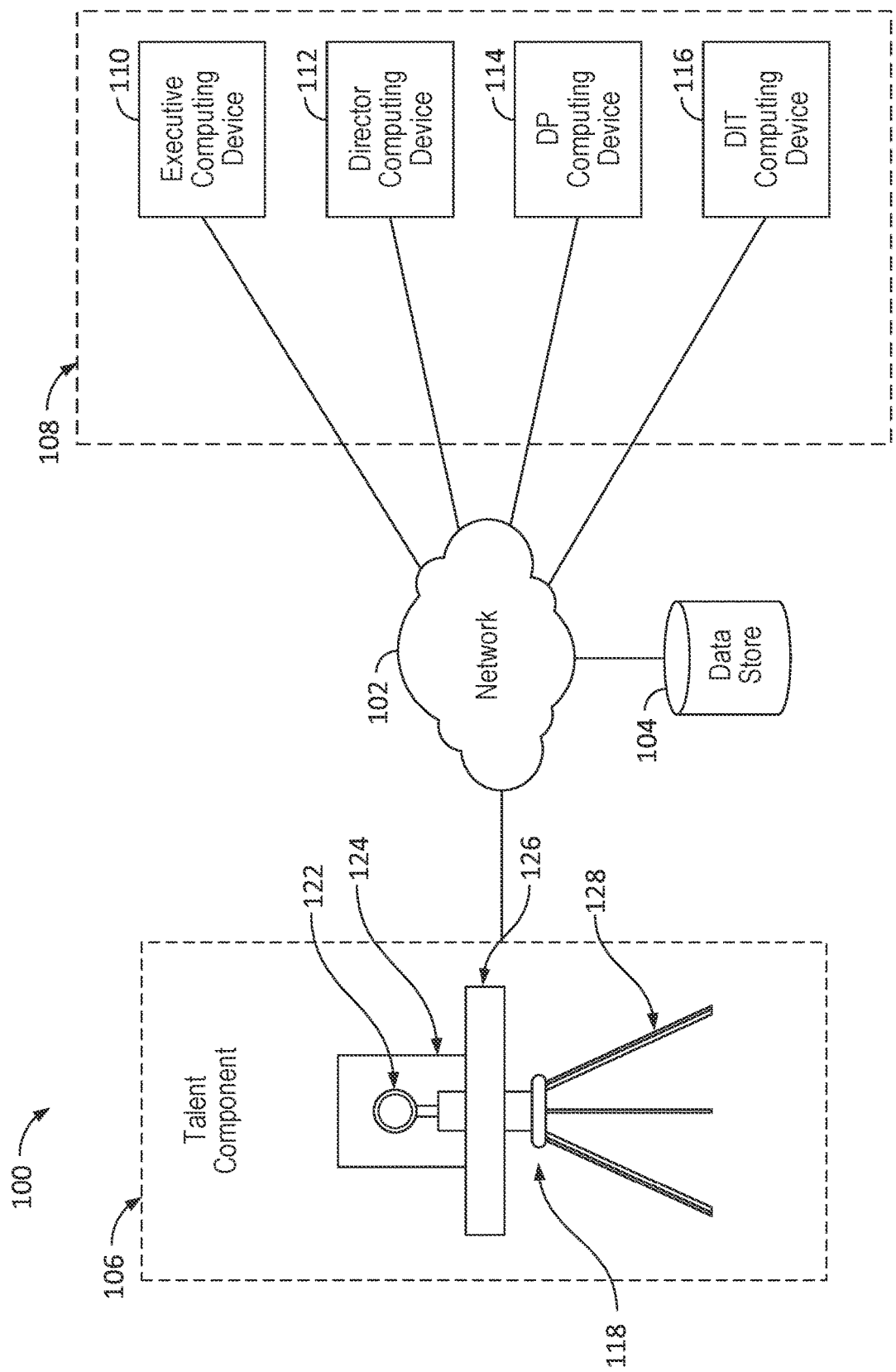
FIG. 1A is a schematic illustration of a system for controlling a set remotely, in accordance with examples described herein.

The present disclosure includes systems and methods for operating a set remotely, and more specifically, for enabling the control of a remotely adjustable audio-visual recording device as well as the communication between the remotely adjustable audio-visual recording device and various specialty devices of a cloud control center configured to remotely control features of the remotely adjustable audio-visual recording device.

For example, specialty devices of a cloud control center may remotely control and communicate with a remotely adjustable audio-visual recording device of a talent component during remote media production. For example, specialty devices may remotely control various features (e.g., zoom features, filter features, slider features, etc.) of the remotely adjustable audio-visual recording device. Such remote control of the various features of the remotely adjustable audio-visual recording device during remote media production enables the remote production of audio-visual content of similar quality and standard to that of audio-visual content generated and/or recorded on-set during in-person media production. In this manner, aspects of the remote recording system help ensure that the remotely recorded final audio-visual content of a remote media production recording is of sufficient quality and standard to broadcast and/or transmit to viewers.

Currently, media production generally requires a controlled set and a large, in-person crew (e.g., a production team) to generate quality audio and/or visual content for broadcast and/or transmission to viewers. The crew generally includes specialized members, such as electricians, camera operators, a director of photography, a digital image technician, grips, gaffers, various other operators, a director, and an executive, etc., that are each responsible for various elements of a production project. For example, grips are generally responsible for building and maintaining camera and lighting set-ups, that is, they are responsible for building dollies, tracks, cranes, and other equipment needed to record audio and/or visual content. Gaffers are often responsible for all the lighting set-ups for the recording. Such in-person media production methods often rely on radio frequency (RF) radios to coordinate the various technical and creative departments, and the cameras (or other recording devices) often rely on manual adjustments made from on-set crew members. In-person content generation during on-set media production, that utilizes the specialized in-person crew members that can communicate via RF radios, increases the likelihood that the audio-visual content recorded will be of sufficient quality and standard to broadcast to viewers.

While the in-person model for media production has been standard practice, there has been a recent migration of media production from the traditional on-set production with a large, specialized crew to media production in remote locations (e.g., to a talent's home) with minimal to no production crew and limited to no communication. While this transition to remote media production has its benefits, it also has its drawbacks. For example, relying on the talent's assistant or the talent himself or herself to properly place, light, and frame a recording may be challenging, and may ultimately compromise the quality of the content generated. Additionally, once the recording is complete and the talent has shipped it back to the production team, if there are any defects in the recording, it would be unlikely, and in some cases impossible, to reshoot the recording.

In an attempt to simplify the migration to remote media production, some current techniques include semi-remote technical recording systems for capturing audio and/or visual content. However, these current techniques suffer from numerous drawbacks, such as not being fully remote, their inability to connect to a network automatically, their dependency on third-party communication methods, and their inability to instantaneously transmit the recording elsewhere (e.g., to a production team) for near real-time review and evaluation. For example, current techniques are not fully remote, as they often require a specialized technician to be on-site to do initial set up and teardown. Additionally, operation of these current techniques often relies on the talent's assistant to connect to the talent's Internet for a network connection.

Further, communication with the talent often relies on the remote technical recording system's connection to third-party communication applications (e.g., ZOOM®). From the third-party communication application, a director may instruction the talent's assistant to make manual adjustments to the positioning and lighting of the technical recording system. After the recording process is complete, such current systems often require the talent's assistant to manually upload the recording to a third-party file transfer/file sharing application (e.g., DROP BOX®)). Consequently, such processes required by current techniques and systems may be both time consuming and manually laborious, may be too heavily dependent upon the production capabilities of the talent and/or the talent's assistant who are generally untrained in media production, and they may suffer from a compromised final recording product that may be unable to be easily re-recorded.

On the contrary, techniques described herein include a remotely adjustable audio-visual recording device communicatively coupled to a cloud control center for remotely controlling, communicating with, and recording audio-visual content using the remotely adjustable audio-visual recording device. In some instances, the system may include a talent component comprising a remotely adjustable audio-visual recording device, and a cloud control center comprising various specialty devices. The talent component may receive a user input indicative of turning on the remotely adjustable audio-visual recording device, and based on receiving the user input, may automatically connect to the cloud control center via a network.

The cloud control center may include various specialty devices, such as a director computing device, a digital image technician computing device, a director of photography computing device, and an executive computing device. In some instances, one or more of these specialty devices may be omitted from the cloud control center. In some instances, additional and/or alternative specialty devices may be included in the cloud control center. Based on connecting to the talent component, the cloud control center may remotely control features of the remotely adjustable audio-visual recording device to orient, position, and/or set up the remotely adjustable audio-visual recording device into an ideal set up for recording audio-visual content.

More particularly, in some instances, the various specialty devices of the cloud control center may each control one or more features of the remotely adjustable audio-visual recording device. For example, one or more of the specialty devices may be configured to control one or more of a stabilization feature, a positioning and orientation feature, a camera feature, a recording feature, and/or a playback feature of the remotely adjustable audio-visual recording device, as well as communicate with various other specialty devices of the cloud control center and the remotely adjustable audio-visual recording device in order to orient, position, and/or set up the remotely adjustable audio-visual recording device into an ideal set up for recording audio-visual content.

In some instances, the remotely adjustable audio-visual recording device may record audio-visual content, as well as both store a local copy of a recording of the audio-visual content at the remotely adjustable audio visual recording device and transmit (and/or store) a cloud copy of the recording of the audio-visual content to the cloud control center for near real-time review, edits, and replay. In this way, techniques described herein allow for the remote media production of high quality audio-visual content by enabling the remote control of a remotely adjustable audio-visual recording device, as well as the communication between the remotely adjustable audio-visual recording device and the various specialty devices of a cloud control center.

Turing to the figures, FIG. 1A is a schematic illustration of a system 100 for controlling a set remotely, in accordance with examples described herein. It should be understood that this and other arrangements and elements (e.g., machines, interfaces, function, orders, and groupings of functions, etc.) can be used in addition to or instead of those shown, and some elements may be omitted altogether. Further, many of the elements described herein are functional entities that may be implemented as discrete or disturbed components or in conjunction with other components, and in any suitable combination and location. Various functions described herein a as being performed by one or more components may be carried out by firmware, hardware, and/or software. For instance, and as described herein, various functions may be carried out by a processing executing instructions stored in memory.

System 100 of FIG. 1A includes data store 104 (e.g., a non-transitory storage medium), talent component 106, and cloud control center 108. Talent component 106 includes remotely adjustable audio-visual recording device 118. Cloud control center 108 includes executive computing device 110, director computing device 112, director of photography (DP) computing device 114, and digital image technician (DIT) computing device 116. It should be understood that system 100 shown in FIG. 1A is an example of one suitable architecture for implementing certain aspects of the present disclosure. Additional, fewer, and/or different components may be used in other examples. It should be noted that implementations of the present disclosure are equally applicable to other types of devices such as mobile computing devices and devices accepting gesture, touch, and/or voice input. Any and all such variations, and any combination thereof, are contemplated to be within the scope of implementations of the present disclosure. Further, although illustrated as separate components of talent component 106, any number of components can be used to perform the functionality described herein. Although illustrated as being a part of talent component 106, the components can be distributed via any number of devices. Similarly, although illustrated as separate components of cloud control center 108, any number of components can be used to perform the functionality described herein. Although illustrated as being a part of cloud control center 108, the components can be distributed via any number of devices.

As shown in FIG. 1A, talent component 106 and cloud control center 108 may communicate with each other via network 102, which may include, without limitation, one or more local area networks (LANs), wide area networks (WANs), and/or cellular communications or mobile communications networks. Such networking environments are commonplace in offices, enterprise-wide computer networks, laboratories, homes, intranets, and the Internet. Accordingly, network 102 is not further described herein. It should be understood that any number of computing devices, sensor devices, and/or displays may be employed within system 100 within the scope of implementations of the present disclosure. Each may comprise a single device or multiple devices cooperating in a distributed environment. For instance, talent component 106 could be provided by multiple server devices collectively providing the functionality of talent component 106 as described herein. Additionally, other components not shown may also be included within the network environment.

Talent component 106 and cloud control center 108 may have access (via network 102) to at least one data store repository, such as data store 104, which stores data and metadata associated with at least a recording (e.g., a local copy, a cloud copy, etc.) of audio-visual content, a recording of audio content, a recording of visual content, as well as quality metadata (e.g., in terms of bit rate) and/or latency metadata associated with frames of the recording of audio-visual content, audio content, and/or visual content. Data store 104 may further store data and metadata associated with takes of the recording of audio-visual content, the recording of visual content, and/or the recording of audio content which in some instances may be utilized by a specialty device for near real-time replay, review, and/or evaluation of the recorded take. As used herein, a take is a portion of a recording of the audio-visual content, where an initiation input begins a take, and a termination input ends a take, where inputs may be generated automatically and/or manually, by for example, one or more of the specialty devices of cloud control center 108, the talent, and the like.

Data store 104 may further store data and metadata associated with various features of a remotely adjustable audio-visual recording device, such as a stabilization feature, a positioning and orientation feature, a camera feature, a recording feature, and/or a playback feature. Data store 104 may even further include data and metadata associated various camera features such as a focus feature, a zoom feature, a pan feature, a filter feature, a white balance/ISO feature, a shutter speed feature, and/or a tilt feature.

In implementations of the present disclosure, data store 104 is configured to be searchable for the data and metadata stored in data store 104. It should be understood that the information stored in data store 104 may include any information relevant to remotely controlling the remotely adjustable audio-visual recording device, capturing and/or recording audio-visual content, communication between the specialty devices and the remotely adjustable audio-visual recording device, as well as communication among the specialty devices. For example, data store 104 may include a recording of audio-visual content. In other examples, data store 104 may include various takes of a recording of audio-visual content that may be replayed by a specialty device in near real-time for review and the like. In further examples, data store 104 may include filter feature information to remotely adjust a filter feature of the remotely adjustable audio-visual recording device.

Such information stored in data store 104 may be accessible to any component of system 100. The content and the volume of such information are not intended to limit the scope of aspects of the present technology in any way. Further, data store 104 may be a single, independent component (as shown) or a plurality of storage devices, for instance, a database cluster, portions of which may reside in association with talent component 106, cloud control center 108, another external computing device (not shown), and/or any combination thereof. Additionally, data store 104 may include a plurality of unrelated data repositories or sources within the scope of embodiments of the present technology. Data store 104 may be updated at any time, including an increase and/or decrease in the amount and/or types of stored data and metadata.

Figure 1B:
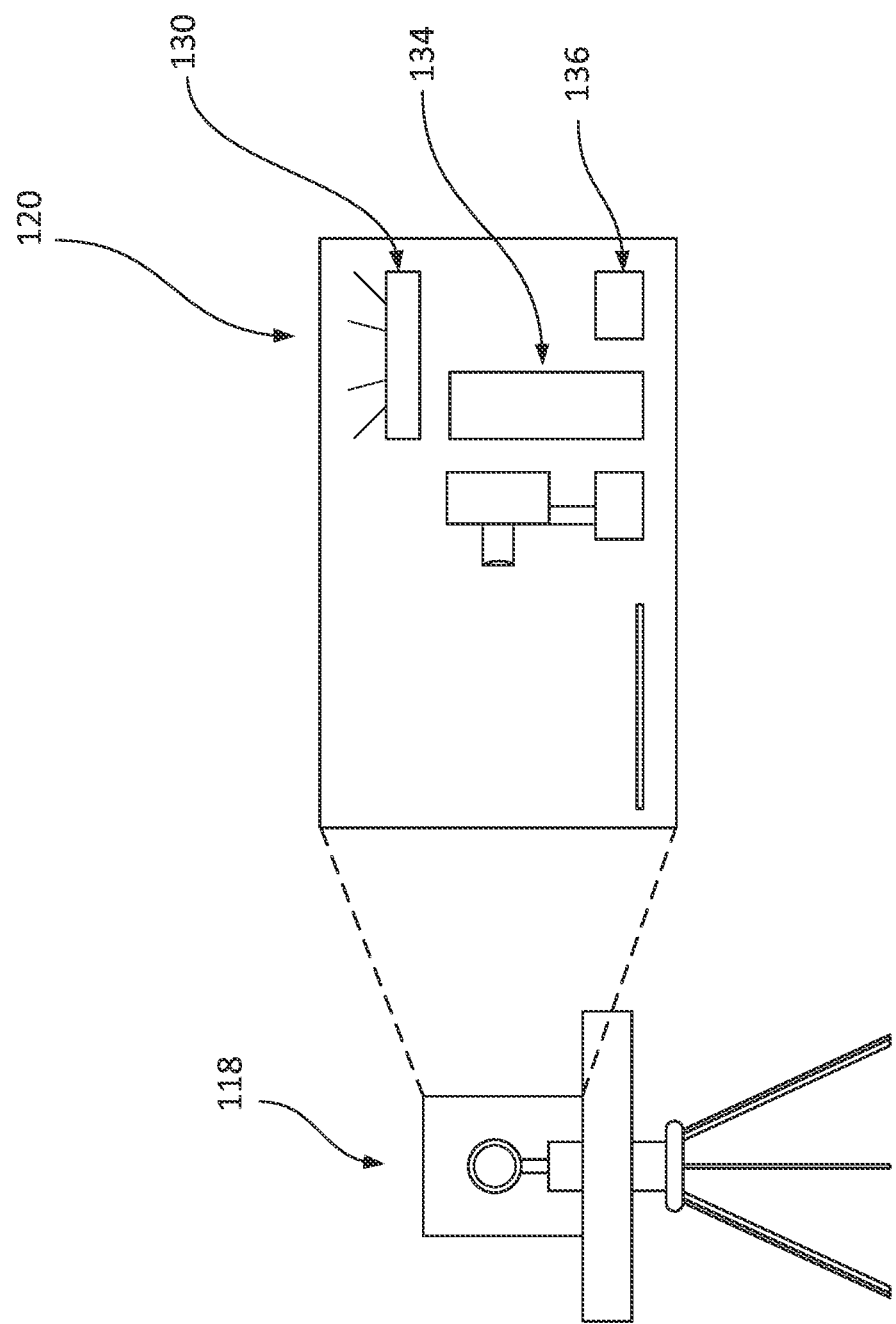
FIG. 1B is a side view of an example remotely adjustable audio-visual recording device, in accordance with examples described herein.

Examples described herein may include talent components, such as talent component 106 of FIG. 1A. Examples of talent component 106 described herein may generally implement the remote recording of audio-visual content. Talent component 106 may include remotely adjustable audio-visual recording device 118. Remotely adjustable audio-visual recording device 118 may include any device capable of remotely recording audio-visual content, audio content only, or visual content only. Remotely adjustable audio-visual recording device 118 may include audio-visual sensor device 122, display 124, slide adjustor 126, and base 128. As illustrated in FIG. 1B, which illustrates a side view of a remotely adjustable audio-visual recording device, such as side view 120 of remotely adjustable audio-visual recording device 118, remotely adjustable audio-visual recording device 118 may further include wireless audio device 130, audio-visual computing device 132, and bonded communications device 134.

Examples of audio-visual sensor device 122 described herein may generally enable the recording (e.g., capture, collection, etc.) of audio-visual content (e.g., data, information) and accompanying metadata during remote media production. Audio-visual sensor device 122 may be implemented using any number of audio-visual sensing devices (e.g., data capture/collection devices), including but not limited to light sensors, image sensors, optical devices, sound recording devices, cameras, video recorders, or any other handheld, mobile, tablet, or wireless (or wired) device capable of recording (e.g., collecting, capturing) audio-visual content and accompanying metadata. In some examples, audio-visual sensor device 122 may include ATEM® iris lens control, and may have, for example, focus and zoom capabilities. As should be appreciated, while recording audio-visual content is generally discussed, remotely adjustable audio-visual recording device may record other types of content, such as, for example, audio-only content, video-only content, and the like.

Examples of display 124 described herein may include monitors, teleprompters, and the like that facilitate display of information (e.g., video, text, etc.). In some examples, display 124 may be a liquid crystal display, plasma display, organic light-emitting diode display, and/or other suitable display for display of information. For example, display 124 may facilitate the ability for a talent to see himself or herself being recorded in real-time (e.g., a "self-view" feature). In other examples, display 124 may provide textual information for a talent to read during a recording of audio-visual content (e.g., a "teleprompter" feature). In further examples, display 124 may simultaneously facilitate the ability for a talent to see himself or herself being recorded in real-time and provide textual information for the talent to read during the recording of audio-visual content. While examples of video and text are described, it should be appreciated that display 124 may facilitate the display of additional and/or alternative information suitable for remote media production that is not described, and that display of such information is contemplated to be within the scope of this disclosure.

In some examples, display 124 supports High Definition Multimedia Interface (HDMI). In other examples, display 124 supports Video Graphics Array (VGA). In even further examples, display 124 supports Digital Video Interface (DVI), DisplayPort, Mini DisplayPort, and/or Thunderbolt. As should be appreciated, while several interface examples are described for display 124 to transmit uncompressed video and/or digital audio (either encrypted or unencrypted), such examples are in no way limiting, and other transmission methods are contemplated to be within the scope of this disclosure.

Examples of slide adjustor 126 described herein may facilitate the positioning, orientation, and the like of remotely adjustable audio-visual recording device 118. In some examples, slide adjustor 126 may adjust remotely adjustable audio-visual recording device 118 (e.g., audio-visual sensor device 122 and/or display 124) horizontally (e.g., moving side to side along a horizontal axis). In other examples, slide adjustor 126 may adjust remotely adjustable audio-visual recording device 118 forwards and backwards. In even further examples, slide adjustor 126 may adjust remotely adjustable audio-visual recording device 118 using additional and/or alternative adjustments. For example, slide adjustor 126 may facilitate additional and/or alternative adjustments, such as a tilt adjustment, a pan adjustment, a roll adjustment, and/or any other adjustment suitable to facilitate positioning and/or orientation of remotely adjustable audio-visual recording device 118. In such manners, the slide adjuster 126 may adjust the views along any axis, including horizontal, vertical, and depth, and although the term "slide" has been used any type of adjustment mechanism including a joystick, roller, or the like may be used or displayed on a user interface.

Examples of base 128 described herein may include a stand, frame, platform, or the like that facilitates the secure support and stabilization of various components of remotely adjustable audio-visual recording device 118, such as, for example, audio-visual sensor device 122, display 124, and/or slide adjustor 126. While base 128 is illustrated as a tripod, it should be appreciated that other types of bases, stands, frames, platforms, and the like are contemplated to be within the scope of this disclosure. It should further be appreciated that while base 128 is illustrated as a component of remotely adjustable audio-visual recording device 118 in FIG. 1A, in some examples base 128 may be optional, and other types of supports, surfaces, and the like may be used as an alternative to base 128. In some examples, base 128 may be eliminated.

Examples of wireless audio device 130 described herein may facilitate audio communication between various specialty devices and remotely adjustable audio-visual recording device 118. For example, upon connection between talent component 106 and cloud control center 108, one or more of the specialty devices of cloud control center 108 may provide verbal instructions for the talent. More specifically, for example, a director controlling director computing device 112 may wish to speak to the talent. In such an example, the director may appear on a display, such as display 124, and wireless audio device 130 may facilitate communication between the talent and the director.

Examples of audio-visual computing device 132 described herein enable the recording of audio-visual content via audio-visual sensor device 122. While not shown, audio-visual computing device 132 may include one or more processors, memory, and executable instructions stored in the memory that, when executed by the one or more processors, enable the recording of audio-visual content via audio-visual sensor device 122. In some examples, audio-visual computing device 132 may be a fan-less processing system (i.e., a processing system that does not have a fan) to assist with noise reduction. In other examples, audio-visual computing device 132 may include a fan for thermal regulation, but may nonetheless assist with noise reduction, e.g., may include insulation or the like that helps to prevent or reduce the sound transmission from the audio-visual computing device 132 to sensors capturing audio content.

Examples of bonded communications device 134 described herein may include any device capable of establishing a robust Internet (or other network) connection for, for example, deploying (e.g., recording, broadcasting, transmitting) recoded audio-visual content. In some examples, bonded communications device 134 may include 3G/4G/LTE/5G modems for combining multiple ADSL or Broadband lines. In some examples, bonded communications device 134 may automatically connect to a cloud control center, such as cloud control center 108, via a network. In some examples, bonded communications device 134 may include a battery (e.g., a large battery).

Examples described herein may also include cloud control centers, such as cloud control center 108 of FIG. 1A. Examples of cloud control center 108 described herein may generally implement the remote control of remotely adjustable audio-visual recording device 118 of talent component 106. Examples of cloud control center 108 described herein may also generally enable communication between cloud control center 108 (including various specialty devices) and remote control of remotely adjustable audio-visual recording device 118 of talent component 106.

Cloud control center 108 may include various specialty devices, such as executive computing device 110, director computing device 112, director of photography (DP) computing device 114, and digital imaging technician (DIT) computing device 116. As described herein, each specialty device of cloud control center 108 may be configured to remotely control features of remotely adjustable audio-visual recording device 118.

In some examples, DP computing device 114 may be configured to present information regarding remotely adjustable audio-visual recording device 118. DP computing device 114 may also be configured to remotely control features of remotely adjustable audio-visual recording device 118 such as a stabilization feature, a positioning and orientation feature, a camera lens feature, a recording feature, or combinations thereof. While not shown, DP computing device 114 may include one or more processors, memory, and executable instructions stored in the memory that, when executed by the one or more processors, enable the control of the various features of remotely adjustable audio-visual recording device 118 by DP computing device 114. In some examples, any kind and/or number of processor may be present in DP computing device 114, including one or more central processing unit(s) (CPUs), graphics processing units (GPUs), other computer processors, mobile processors, digital signal processors (DSPs), microprocessors, computer chips, and/or processing units configured to execute machine-language instructions and process data, such as executable instructions that enable the control of the various features of remotely adjustable audio-visual recording device 118 by DP computing device 114. In some examples, any type or kind of memory may be present (e.g., read only memory (ROM), random access memory (RAM), solid state drive (SSD), and secure digital card (SD card)).

In some examples, DIT computing device 116 may be configured to present information regarding remotely adjustable audio-visual recording device 118. DIT computing device 116 may also be configured to remotely control features of remotely adjustable audio-visual recording device 118 such as a stabilization feature, a positioning and orientation feature, a camera lens feature, a recording feature, or combinations thereof. While not shown, DIT computing device 116 may include one or more processors, memory, and executable instructions stored in the memory that, when executed by the one or more processors, enable the control of the various features of remotely adjustable audio-visual recording device 118 by DIT computing device 116. In some examples, any kind and/or number of processor may be present in DIT computing device 116, including one or more central processing unit(s) (CPUs), graphics processing units (GPUs), other computer processors, mobile processors, digital signal processors (DSPs), microprocessors, computer chips, and/or processing units configured to execute machine-language instructions and process data, such as executable instructions that enable the control of the various features of remotely adjustable audio-visual recording device 118 by DIT computing device 116. In some examples, any type or kind of memory may be present (e.g., read only memory (ROM), random access memory (RAM), solid state drive (SSD), and secure digital card (SD card)).

In some examples, executive computing device 110 may be configured to present information regarding remotely adjustable audio-visual recording device 118 and remotely control features such as control a playback feature of remotely adjustable audio-visual recording device 118, wherein the playback feature comprises replaying one or more takes of a plurality of takes (e.g., recent takes 212-218 of recent takes list 208 of FIG. 2) of the recording of the audio-visual content. While not shown, executive computing device 110 may include one or more processors, memory, and executable instructions stored in the memory that, when executed by the one or more processors, enable the control of the various features of remotely adjustable audio-visual recording device 118 by executive computing device 110. In some examples, any kind and/or number of processor may be present in executive computing device 110, including one or more central processing unit(s) (CPUs), graphics processing units (GPUs), other computer processors, mobile processors, digital signal processors (DSPs), microprocessors, computer chips, and/or processing units configured to execute machine-language instructions and process data, such as executable instructions that enable the control of the various features of remotely adjustable audio-visual recording device 118 by executive computing device 110. In some examples, any type or kind of memory may be present (e.g., read only memory (ROM), random access memory (RAM), solid state drive (SSD), and secure digital card (SD card)).

In some examples, director computing device 112 may be configured to present information regarding remotely adjustable audio-visual recording device 118. Director computing device 110 may also be configured to remotely control features of remotely adjustable audio-visual recording device 118 such as one or more of a stabilization feature, a positioning and orientation feature, a camera feature, a recording feature, a playback feature, or combinations thereof. As described herein, in some examples, the camera feature may comprise one or more of a focus feature, a zoom feature, a pan feature, filter feature, a white balance/ISO feature, a shutter speed feature, a tilt feature, a shutter angle feature, or combinations thereof, of remotely adjustable audio-visual recording device 118. While not shown, director computing device 112 may include one or more processors, memory, and executable instructions stored in the memory that, when executed by the one or more processors, enable the control of the various features of remotely adjustable audio-visual recording device 118 by director computing device 110. In some examples, any kind and/or number of processor may be present in director computing device 112, including one or more central processing unit(s) (CPUs), graphics processing units (GPUs), other computer processors, mobile processors, digital signal processors (DSPs), microprocessors, computer chips, and/or processing units configured to execute machine-language instructions and process data, such as executable instructions that enable the control of the various features of remotely adjustable audio-visual recording device 118 by director computing device 112. In some examples, any type or kind of memory may be present (e.g., read only memory (ROM), random access memory (RAM), solid state drive (SSD), and secure digital card (SD card)).

As should be appreciated, while only executive computing device 110, director computing device 112, DP computing device 114, and DIT computing device 116 are shown as specialty devices of cloud control center 108, additional and/or alternative specialty devices for controlling the same and/or additional features of remotely adjustable audio-visual recording device 118, as well as communicating between the specialty devices and remotely adjustable audio-visual recording device 118, and among specialty devices of cloud control center 108 are contemplated to be within the scope of this disclosure.

In operation, to enable the remote control of a set and the remote generation (e.g. recording) of audio-visual content, talent component 106 comprising remotely adjustable audio-visual recording device 118 may be configured to receive a user input indicative of turning on remotely adjustable audio-visual recording device 118. Based on receiving the user input, talent component 106 may further be configured to automatically connect, via a network (such as network 102) to cloud control center 108. In some examples, connecting to cloud control center 108 is based at least on talent component 106 calling an application programming interface (API) corresponding to cloud control center 108.

As described herein, cloud control center 108 may comprise various (e.g., a plurality of) specialty devices, where each of the specialty devices is configured to present information and enable control of features corresponding to audio-visual content captured by remotely adjustable audio-visual recording device 118 of talent component 106, and relevant to a corresponding specialty device. In operation, cloud control center 108 may be configured to, based on connecting to talent component 106 via a network (such as network 102), control remotely adjustable audio-visual recording device 118 of talent component 106. In some examples, controlling remotely adjustable audio-visual recording device 118 of talent component 106 may be based at least on cloud control center 108 calling a rest API corresponding to the remotely adjustable audio-visual recording device 118.

In some examples, cloud control center 108 may be further configured to, based on determining remotely adjustable audio-visual recording device 118 is in an optimized location (e.g., ideal orientation and/or position, ideal lighting and/or filtering, ideal focal length (zoom in/zoom out, etc.)) begin (e.g., automatically begin) a recording of the audio-visual content.

In some examples, remotely adjustable audio-visual recording device 118 of talent component 106 is configured to add metadata to one or more frames of a plurality of frames of the recording of the audio-visual content. In some examples, the metadata added to one or more frames of a plurality of frames of the recording of the audio-visual content may indicate a quality (e.g., in terms of bit rate), a latency, or combinations thereof, for each of the one or more frames of the plurality of frames of the recording of the audio-visual content.

In some examples, based on receiving an input from a specialty device of the plurality of specialty devices indicative of initiating a take and terminating a take, remotely adjustable audio-visual recording device 118 of talent component 106 may add metadata to each frame corresponding to the beginning frame and end frame of the take. In some examples, the added metadata may be indicative of the beginning and end of the take.

As should be appreciated, in some instances when remotely adjustable audio-visual recording device 118 of talent component 106 automatically begins recording when turned on, remotely adjustable audio-visual recording device 118 of talent component 106 may automatically begin a take and automatically add metadata to the frame corresponding to the beginning of the take, without the need for input from any specialty device in cloud control center 108. Further, in some instances, remotely adjustable audio-visual recording device 118 of talent component 106 may automatically end a take and automatically add metadata to the frame corresponding to the last frame of the take, without the need for inform from any specialty device in cloud control center 108.

As should be further appreciated, in some instances, based on remotely adjustable audio-visual recording device 118 of talent component 106 receiving an input (e.g., from a talent, from a talent's assistant, etc.) to begin and/or end a take, remotely adjustable audio-visual recording device 118 of talent component 106 may in response add metadata to the frame corresponding to the beginning of the take and/or the end of a take indicated by the received input. In some instances, a take may be paused and restarted (e.g., based on receiving an input from an individual, based on receiving an input from a specialty device, etc.). It should be noted that in some embodiments, the input may be received remotely, such as, for example, from one or more specialty devices from cloud control center 108 and/or director computing device 112.

In some examples, cloud control center 108 may be further configured to store a local copy of the recording of the audio-visual content at the remotely adjustable audio-visual recording device 118 and/or store a cloud copy of the recording of the audio-visual content at the cloud control center 108. In some examples, cloud control center 108 may store the local copy of the recording of the audio-visual content at a data store, such as data store 104, that is local to remotely adjustable audio-visual recording device 118. In some examples, cloud control center 108 may store the cloud copy of the recording of the audio-visual content at a data store, such as data store 104, that is remote from remotely adjustable audio-visual recording device 118 but that is local to cloud control center 108. In some examples, cloud control center 108 may store more than one copy of the recording of the audio-visual content at data stores in various locations. In some examples, the cloud control center may receive a transmission of the recording via HVEC to assist with overall production quality of the recording.

In some examples, remotely adjustable audio-visual recording device 118 of talent component 106 may transmit takes of a recording of audio-visual content, or the entirety of a recording of audio-visual content, in near-real time, to cloud control center 108. In some examples, remotely adjustable audio-visual recording device 118 of talent component 106 may transmit the takes or the recording of audio-visual content using various video compression formats, such as, for example, H.265, H.264, AV1, etc. As should be appreciated, while three examples of video compression formats are listed, these examples are in no way limiting, and other suitable video compression formats are contemplated to be within the scope of this disclosure.

In some examples, the various specialty devices are configured to present information and control features corresponding to the audio-visual content captured by remotely adjustable audio-visual recording device 118 of talent component 106. In some examples, such specialty devices may include a director computing device, a digital image technician computing device, a director of photography computing device, an executive computing device, or combinations thereof.

In some examples, director computing device 112 may be configured to present information regarding and remotely control one or more of a stabilization feature, a positioning and orientation feature, a camera feature, a recording feature, a playback feature, or combinations thereof, of remotely adjustable audio-visual recording device 118 of talent component 106. In some examples, director computing device 112 may be further configured to communicate with remotely adjustable audio-visual recording device 118 of talent component 106, as well as among the various other specialty devices of cloud control center 108. In some examples, the camera feature comprises one or more of a focus feature, a zoom feature, a pan feature, filter feature, a white balance/ISO feature, a shutter speed feature, a tilt feature, a shutter angle feature, or combinations thereof, of remotely adjustable audio-visual recording device 118 of talent component 106. As discussed herein, in some examples, director computing device 112 may control various features of remotely adjustable audio-visual recording device 118 of talent component 106 by calling the rest API corresponding to remotely adjustable audio-visual recording device 118 of talent component 106.

In some examples, DIT computing device 116 may be configured to control a stabilization feature, a positioning and orientation feature, a camera lens feature, a recording feature, or combinations thereof, of remotely adjustable audio-visual recording device 118 of talent component 106. In some examples, DIT computing device 116 may be further configured to communicate with remotely adjustable audio-visual recording device 118 of talent component 106, as well as among the various other specialty devices of cloud control center 108. In some examples, DIT computing device 116 may be limited to specific communications between specific specialty devices. As discussed herein, in some examples, DIT computing device 116 may control various features of remotely adjustable audio-visual recording device 118 of talent component 106 by calling the rest API corresponding to remotely adjustable audio-visual recording device 118 of talent component 106.

In some examples, DP computing device 114 may be configured to control a stabilization feature, a positioning and orientation feature, a camera lens feature, a recording feature, or combinations thereof, of remotely adjustable audio-visual recording device 118 of talent component 106. In some examples, DP computing device 114 may be further configured to communicate with remotely adjustable audio-visual recording device 118 of talent component 106, as well as among the various other specialty devices of cloud control center 108. Similar to DIT computing device 116, in some examples, DP computing device 114 may be limited to specific communications between specific specialty devices. As discussed herein, in some examples, DP computing device 114 may control various features of remotely adjustable audio-visual recording device 118 of talent component 106 by calling the rest API corresponding to remotely adjustable audio-visual recording device 118 of talent component 106.

Figure 2:
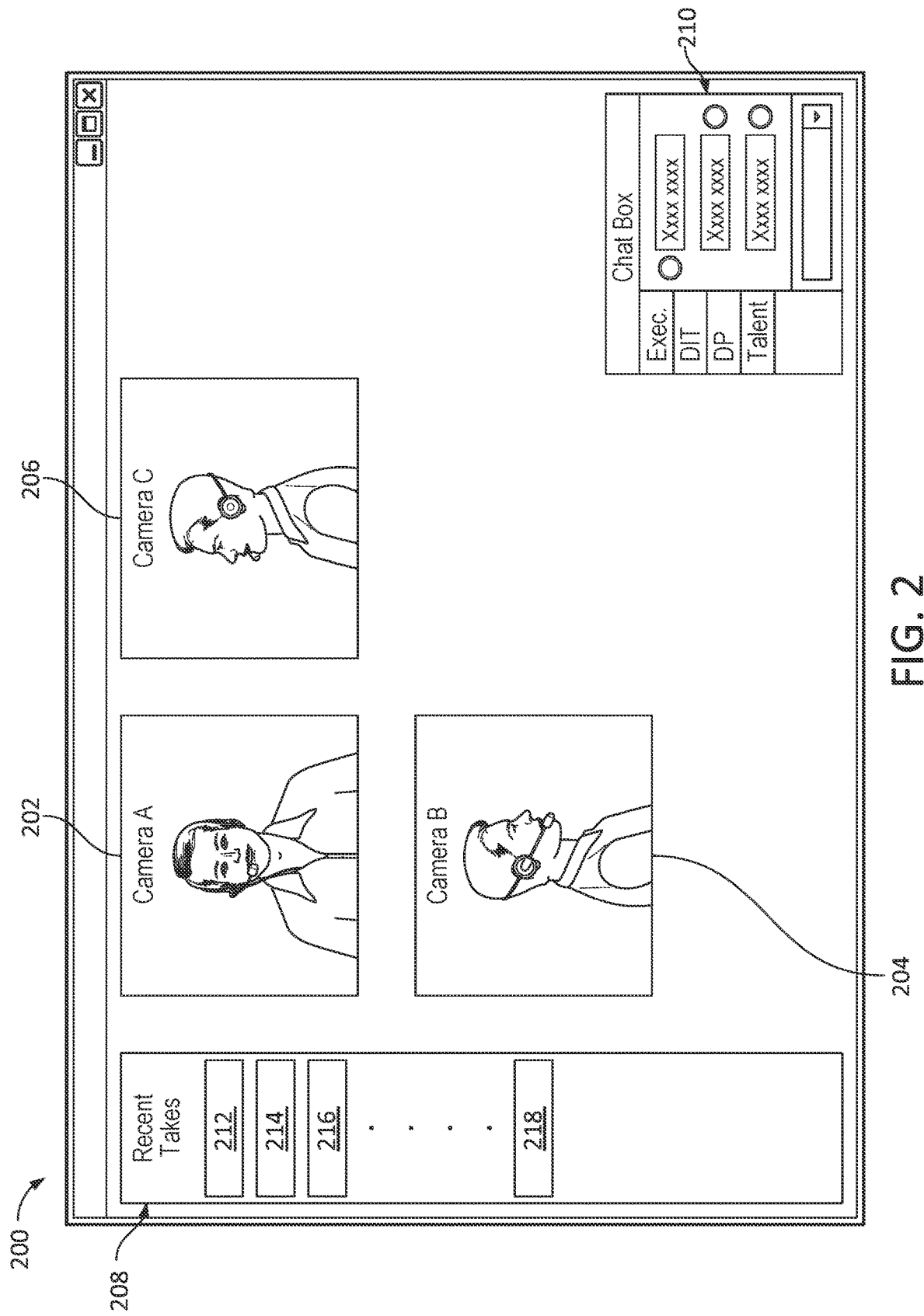
FIG. 2 is an example user interface for controlling a set remotely, in accordance with examples described herein.

In some examples, executive computing device 110 may be configured to control a playback feature of remotely adjustable audio-visual recording device 118 of talent component 106, where the playback feature comprises replaying one or more takes of a plurality of takes of the recording of the audio-visual content (e.g., recent takes 212-218 of recent takes list 208 of FIG. 2).

While each of the specialty devices described herein are configured to control various (and sometimes similar) features of remotely adjustable audio-visual recording device 118 of talent component 106, each specialty device is further configured to have exclusive control of at least one feature of the features corresponding to the audio-visual content captured by the talent component exclusively relevant to the corresponding specialty device. In some examples, various specialty devices are configured to have limited control over features, and/or control over a limited number of features. In some examples, director computing device 112 is configured to control all of the features corresponding to the audio-visual content captured by remotely adjustable audio-visual recording device 118 of talent component 106.

Now turning to FIB. 1B, FIG. 1B is a side view of example remotely adjustable audio-visual recording device, in accordance with examples described herein. As illustrated, FIG. 1B includes side view 120 of remotely adjustable audio-visual recording device 118. Side view 120 of remotely adjustable audio-visual recording device 118 includes various components of remotely adjustable audio-visual recording device 118 such as wireless audio device 130, audio-visual computing device 132, and bonded communications device 134. As should be appreciated, additional and/or alternative and/or fewer components may be included than those illustrated in side view 120. As these components are already described herein, they will not be further described here.

Now turning to FIG. 2, FIG. 2 is an example user interface for controlling a set remotely, in accordance with examples described herein. User interface 200 includes camera angles 202, 204, and 206 (hereinafter referred to as "camera angles 202-206"), recent takes list 208, and chat box 210. Recent takes list includes recent takes 212, 214, 216, and 218 (herein after referred to as "recent takes 212-218). As described herein, various specialty devices of cloud control center 108 are configured to present information and control various features of remotely adjustable audio-visual recording device 118 of talent component 106. As descried herein, user interface 200 is a non-inclusive example illustration of information presented to a specialty device (or to a user of a specialty device) of cloud control center 108 during remote media production.

In some examples, and as described herein, director computing device 112 may be configured to present information regarding various features of remotely adjustable audio-visual recording device 118 of talent component 106, as well as additional information such as various camera views of a talent during media production, various takes of the recording of audio-visual content, and an interface to communicate with other components of the system. Director computing device 112 may present camera angles, such as camera angles 202-206, to a director during remote media production. Such information may allow a director to review and evaluate in near-real time the talent's current performance during remote media production of audio-visual content.

As should be appreciated, the number of camera angles, such as camera angles 202-206, presented may depend on the number of remotely adjustable audio-visual recording devices that are recording audio-visual content. The number of camera angles presented may further depend on the capabilities of the remotely adjustable audio-visual recording device(s) recording the audio-visual content. In some examples, a single remotely adjustable audio-visual recording device, such as remotely adjustable audio-visual recording device 118, may be capable of recording audio-visual content, one camera angle at a time. In some examples, a single remotely adjustable audio-visual recording device, such as remotely adjustable audio-visual recording device 118, may be capable of recording audio-visual content at multiple camera angles at a time. In some examples, more than one remotely adjustable audio-visual recording device, each capable of recording audio-visual content one camera angle at a time, may record audio-visual content each at a different camera angle, simultaneously. It should additionally be appreciated that a remotely adjustable audio-visual recording device capable of recording audio-visual content at a single camera angle at a time may be moved to a different location to record audio-visual content at a different camera angle.

Similarly, director computing device 112 may present the director with a recent takes list, such as recent takes list 208 that includes recent takes of the recording of audio-visual content, such as recent takes 212-218. Director computing device 112 may present recent takes 212-218 of recent takes list 208 to a director during remote media production. Such information allows a director to review and evaluate in near-real time the talent's past performance during remote media production of audio-visual content.

Additionally, director computing device 112 may present the director with a communication interface, such as chat box 210, for communicating with a talent (or other individual) using remotely adjustable audio-visual recording device 118 of talent component 106, as well as for communicating with other specialty devices. Director computing device 112 may present chat box 210 to a director during remote media production. Such an interface allows the director to communicate any changes, updates, or the like that need to be made in near-real time to the talent using remotely adjustable audio-visual recording device 118 of talent component 106, as well as to the other specialty devices or operators thereof that may control features of remotely adjustable audio-visual recording device 118 of talent component 106.

Advantageously, the presentation of such camera angle information, recent takes information, and communications information enables the director to better improve the overall quality of the recording of the audio-visual content by enabling near-real time viewing of a recording, easy playback of various takes, and near-real time communication with other specialty devices that control various features of the remotely adjustable audio-visual recording device of the talent component during remote media production.

As should be appreciated, while user interface 200 includes camera angles 202-206, recent takes list 208, recent takes 212-218, and chat box 210, additional and/or alternative information associated with various features controlled by the various specialty devices described herein may also be presented on user interface 200, and the current information illustrated on user interface 200 is in no way limiting. In some examples, less information may be presented (e.g., displayed) on user interface 200. In some examples, more information may be presented (e.g., displayed) on user interface 200. In some examples, no information may be presented (e.g., displayed) on user interface 200. In some cases, information associated with all of the features controlled by the various specialty devices described herein may be presented (e.g., displayed) on user interface 200.

Figure 3:
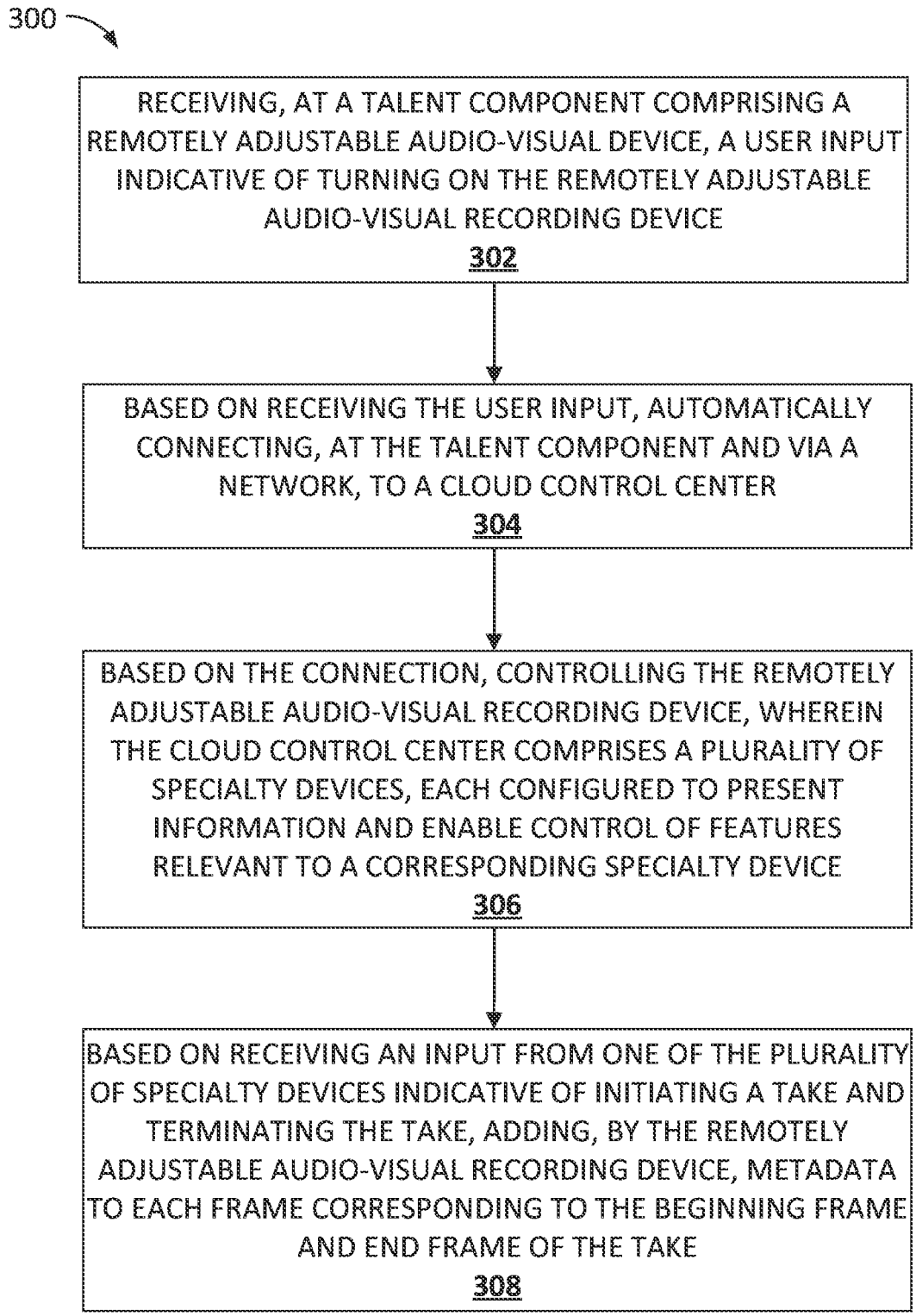
FIG. 3 is a flowchart of a method for controlling a set remotely, in accordance with examples described herein.

Now turning to FIG. 3, FIG. 3 is a flowchart of a method 300 for controlling a set remotely, in accordance with examples described herein. The method 300 may be implemented, for example, using the system 100 of FIG. 1A.

The method 300 includes receiving, at a talent component comprising a remotely adjustable audio-visual device, a user input indicative of turning on the remotely adjustable audio-visual recording device in step 302; based on receiving the user input, automatically connecting, at the talent component and via a network, to a cloud control center in step 304; based on connecting to the talent component, control, by the cloud control center, the remotely adjustable audio-visual recording device, wherein the cloud control center comprises a plurality of specialty devices, each of the plurality of specialty devices configured to present information and enable control of features corresponding to audio-visual content captured by the talent component and relevant to a corresponding specialty device in step 306; and based on receiving an input from one of the plurality of specialty devices indicative of initiating a take and terminating the take, adding, by the remotely adjustable audio-visual recording device, metadata to each frame corresponding to the beginning frame and end frame of the take, optionally in step 308.

Step 302 includes receiving, at a talent component comprising a remotely adjustable audio-visual device, a user input indicative of turning on the remotely adjustable audio-visual recording device.

Step 304 includes based on receiving the user input, automatically connecting, at the talent component and via a network, to a cloud control center. As described herein, in some examples, connecting to cloud control center 108 is based at least on talent component 106 calling an application programming interface (API) corresponding to cloud control center 108.

Step 306 includes, based on connecting to the talent component, control, by the cloud control center, the remotely adjustable audio-visual recording device, wherein the cloud control center comprises a plurality of specialty devices, each of the plurality of specialty devices configured to present information and enable control of features corresponding to audio-visual content captured by the talent component and relevant to a corresponding specialty device. In some examples, controlling remotely adjustable audio-visual recording device 118 of talent component 106 may be based at least on cloud control center 108 calling a rest API corresponding to the remotely adjustable audio-visual recording device 118.

In some examples, the various specialty devices are configured to present information (e.g., via a display) and control features corresponding to the audio-visual content captured by remotely adjustable audio-visual recording device 118 of talent component 106. In some examples, such specialty devices may include a director computing device, a DIT computing device, a DP computing device, an executive computing device, or combinations thereof.

In some examples, which the various specialty devices described herein may be configured to control various (and sometimes similar) features of remotely adjustable audio-visual recording device 118 of talent component 106, each specialty device may be further configured to have exclusive control of at least one feature of the features corresponding to the audio-visual content captured by talent component 106 exclusively relevant to the corresponding specialty device.

For example, in some instances, digital image technician computing device 116, director of photography computing device 114, and executive computing device 110 may each be configured to have control (e.g., exclusive control) of at least one feature of the features corresponding to the audio-visual content captured by the talent component exclusively relevant to each of the corresponding digital image technician computing device 116, director of photography computing device 114, and executive computing device 110, and separate from other features controlled by each of digital image technician computing device 116, director of photography computing device 114, and executive computing device 110. For example, director of photography computing device 114 may be configured to have control over a feature that digital image technician computing device 116 and executive computing device 110 may not be configured to control. Similarly, in another example, digital image technician computing device 116 may be configured to have control over a feature that director of photography computing device 114 and executive computing device 110 may not be configured to control. In some examples, while each of digital image technician computing device 116, director of photography computing device 114, and executive computing device 110 may each be configured to have control over features that the other specialty devices (e.g., of digital image technician computing device 116, director of photography computing device 114, and executive computing device 110) may not be configured to control, director computing device 112 may configured to control all of the features corresponding to the audio-visual content captured by the talent component.

In some examples, various specialty devices are configured to have limited control over features, and/or control over a limited number of features. In some examples, the director computing device is configured to control all of the features corresponding to the audio-visual content captured by remotely adjustable audio-visual recording device 118 of talent component 106.

In some examples, cloud control center 108 may be configured to, based on determining remotely adjustable audio-visual recording device 118 is in a location satisfying at least one condition, begin a recording of the audio-visual content. For example, in some instances, information regarding the environment of the remotely adjustable audio-visual recording device 118 may be sensed (e.g., by lighting, sound or other sensors) and when a sensed characteristic is within a predetermined threshold or satisfies a condition, the remotely adjustable audio-visual recording device 118 may be considered to be in an optimized location and recording can begin. In some examples, determining remotely adjustable audio-visual recording device 118 is in an optimized location or that a location condition is satisfied may be based on a specialty device and/or a user of a specialty device (e.g., director computing device 112 or executive computing device 110) providing feedback to remotely adjustable audio-visual recording device 118 and/or to the talent using remotely adjustable audio-visual recording device 118 that remotely adjustable audio-visual recording device 118 is in the optimized location. In some examples, determining remotely adjustable audio-visual recording device 118 is in an optimized location may be based on remotely adjustable audio-visual recording device 118 automatically determining one or more of a predefined lighting condition, a predefined tilt and/or angle condition, or a predefined zoom condition is met.

In some examples, remotely adjustable audio-visual recording device 118 of talent component 106 may be configured to add metadata to one or more frames of a plurality of frames of the recording of the audio-visual content, where the metadata added to one or more frames of a plurality of frames of the recording of the audio-visual content may indicate a quality (e.g., in terms of bit rate), a latency, or combinations thereof, for each of the one or more frames of the plurality of frames of the recording of the audio-visual content.

Optionally, step 308 includes based on receiving an input from one of the plurality of specialty devices indicative of initiating a take and terminating the take, adding, by the remotely adjustable audio-visual recording device, metadata to each frame corresponding to the beginning frame and end frame of the take. In some examples, cloud control center 108 may be further configured to store a local copy of the recording of the audio-visual content at the remotely adjustable audio-visual recording device and store a cloud copy of the recording of the audio-visual content at the cloud control center. In some examples, cloud control center 108 may be further configured to store various takes (e.g., recent takes) associated with the recording of the audio-visual content. In some examples, the recent takes may be stored locally at the remotely adjustable audio-visual recording device. In some examples, the recent takes may be stored at the cloud control center.

Now turning to FIG. 4, FIG. 4 is a schematic diagram of an example computing system 400 for implementing various embodiments in the examples described herein. Computing system 400 may be used to implement the talent component 106, cloud control center 108, or it may be integrated into one or more of the components of system 100, such as the specialty devices 110, 112, 114, and 116. Computing system 400 may be used to implement or execute one or more of the components or operations disclosed in FIGS. 1-3. In FIG. 4, computing system 400 may include one or more processors 402, an input/output (I/O) interface 404, a display 406, one or more memory components 408, and a network interface 410. Each of the various components may be in communication with one another through one or more buses or communication networks, such as wired or wireless networks.

Processors 402 may be implemented using generally any type of electronic device capable of processing, receiving, and/or transmitting instructions. For example, processors 402 may include or be implemented by a central processing unit, microprocessor, processor, microcontroller, or programmable logic components (e.g., FPGAs). Additionally, it should be noted that some components of computing system 400 may be controlled by a first processor and other components may be controlled by a second processor, where the first and second processors may or may not be in communication with each other.

Memory components 408 are used by computing system 400 to store instructions, such as executable instructions discussed herein, for the processors 402, as well as to store data, such as recorded audio-visual content data and the like. Memory components 408 may be, for example, magneto-optical storage, read-only memory, random access memory, erasable programmable memory, flash memory, or a combination of one or more types of memory components.

Display 406 provides visual feedback to a user (e.g., a talent, a director, a specialty crew member, etc.), such as user interface elements displayed by display 124 or information presented by the various specialty devices. Optionally, display 406 may act as an input element to enable a user of a specialty device to remotely control, manipulate, and calibrate various components and/or features of the system 100 as described in the present disclosure. Display 406 may be a liquid crystal display, plasma display, organic light-emitting diode display, and/or other suitable display. In embodiments where display 406 is used as an input, display 406 may include one or more touch or input sensors, such as capacitive touch sensors, a resistive grid, or the like.

The I/O interface 404 allows a user to enter data into the computing system 400, as well as provides an input/output for the computing system 400 to communicate with other devices or services, such as talent component 106 and cloud control center 108 of FIG. 1A. I/O interface 404 can include one or more input buttons, touch pads, track pads, mice, keyboards, audio inputs (e.g., microphones), audio outputs (e.g., speakers), and so on.

Network interface 410 provides communication to and from the computing system 400 to other devices. For example, network interface 410 may allow talent component 106 to communicate with cloud control center 108 through a communication network. Network interface 410 includes one or more communication protocols, such as, but not limited to Wi-Fi, Ethernet, Bluetooth, cellular data networks, and so on. Network interface 410 may also include one or more hardwired components, such as a Universal Serial Bus (USB) cable, or the like. The configuration of network interface 410 depends on the types of communication desired and may be modified to communicate via Wi-Fi, Bluetooth, and so on.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A system comprising:
a distributed cloud control center communicatively coupled to one or more specialty devices and one or more remotely adjustable audio-visual recording devices, the one or more remotely adjustable audio-visual recording devices remote from the distributed cloud control center, wherein each specialty device is configured to control one or more features of a plurality of features associated with an audio-visual content recording captured by the one or more remotely adjustable audio-visual recording devices; and
a specialty device of the one or more specialty devices configured to update a feature of the one or more features associated with the audio-visual content recording by communicating with at least one of the one or more remotely adjustable audio-visual recording devices to adjust an aspect of the at least one of the one or more remotely adjustable audio-visual recording devices corresponding to the feature, wherein the specialty device automatically updates the feature responsive to a remote input at the distributed cloud control center communicated to the specialty device.

2. The system of claim 1, wherein the one or more specialty devices includes a first set of specialty devices each configured to control a respective subset of the one or more features of the plurality of features associated with the audio-visual content recording, and a second set of specialty devices each configured to control all of the one or more features of the plurality of features associated with the audio-visual content recording.

3. The system of claim 2, wherein the first set of specialty devices comprises a digital image technician device, a director of photography computing device, an executive device, or combinations thereof.

4. The system of claim 3, wherein the digital image technician device is configured to control at least orientation and positioning features of the plurality of features associated with the audio-visual content recording.

5. The system of claim 4, wherein the digital image technician device is further configured to control one or more of a stabilization feature, a lens feature, or a recording feature of the audio-visual content recording.

6. The system of claim 3, wherein the director of photography computing device is configured to control stabilization and lens features of the plurality of features associated with the audio-visual content recording.

7. The system of claim 6, wherein the director of photography computing device is further configured to control one or more of a positioning feature, an orientation feature, or a recording feature of the audio-visual content recording.

8. The system of claim 3, wherein the executive device is configured to control playback features of the plurality of features associated with the audio-visual content recording.

9. The system of claim 8, wherein the playback features controlled by the executive device comprise replaying one or more segments of the audio-visual content recording, each of the one or more segments including one or more takes.

10. The system of claim 2, wherein the second set of specialty devices comprises at least a director computing device, wherein the director computing device is configured to control all of the one or more features of the plurality of features.

11. The system of claim 10, wherein the one or more features of the audio-visual content recording controlled by the director computing device comprise orientation and positioning features, stabilization and lens features, playback features, or combinations thereof.

12. The system of claim 10, wherein the one or more features of the audio-visual content recording controlled by the director computing device comprise a focus feature, a zoom feature, a pan feature, filter feature, a white balance/ISO feature, a shutter speed feature, a tilt feature, a shutter angle feature, or combinations thereof.

13. The system of claim 1, wherein each of the one or more specialty devices is further configured to present information regarding the audio-visual content recording for remote updating.

14. The system of claim 1, wherein each of the one or more specialty devices is further configured to concurrently control the audio-visual content recording and at least one additional audio-visual content recording.

15. The system of claim 1, wherein the specialty device of the one or more specialty devices is remote to the one or more remotely adjustable audio-visual recording devices, and wherein at least another specialty device of the one or more specialty devices is local to the one or more remotely adjustable audio-visual recording devices.

16. The system of claim 1, wherein the update of the feature corresponds to beginning, restarting, or ending a recording of the audio-visual content recording captured by the one or more remotely adjustable audio-visual recording devices.

17. A method comprising:
receiving, at a distributed cloud control center in communication with one or more specialty devices, audio-visual content during media production recording, wherein the audio-visual content is captured by one or more remotely adjustable audio-visual recording devices communicatively coupled to the distributed cloud control center, the one or more remotely adjustable audio-visual recording devices remote from the distributed cloud control center; and
updating by at least one of the one or more specialty devices, one or more features of a media production recording of the audio-visual content by communicating with at least one of the one or more remotely adjustable audio-visual recording devices to adjust an aspect of the at least one of the one or more remotely adjustable audio-visual recording devices corresponding to the feature, wherein the one or more specialty devices automatically update the feature responsive to a remote input at the distributed cloud control center communicated to the one or more specialty devices.

18. The method of claim 17, wherein the one or more specialty devices comprises a first set of specialty devices and a second set of specialty devices, wherein each specialty device in the first set controls at least one of the one or more features of the media production recording of the audio-visual content, and wherein each specialty device in the second set controls all of the one or more features of the media production recording of the audio-visual content.

19. The method of claim 18, wherein the at least one of the one or more features of the media production recording of the audio-visual content controlled by the first set of specialty devices comprise one or more of orientation and positioning features, control stabilization and lens features, playback features, or combinations thereof.

20. The method of claim 18, wherein the one or more features of the media production recording of the audio-visual content controlled by the second set of specialty devices comprise one or more of orientation and positioning features, stabilization and lens features, playback features, a focus feature, a zoom feature, a pan feature, filter feature, a white balance/ISO feature, a shutter speed feature, a tilt feature, a shutter angle feature, or combinations thereof.

21. A system comprising:
a distributed cloud control center;
a remotely adjustable audio-visual recording device remote from and communicatively coupled to the distributed cloud control center; and
a specialty device communicatively coupled to the distributed cloud control center, the specialty device being configured to control a feature associated with an audio-visual content recording captured by the remotely adjustable audio-visual recording device,
wherein the specialty device is configured to automatically update the feature, responsive to a remote input at the distributed cloud control center communicated to the specialty device, by communicating with the remotely adjustable audio-visual recording device to adjust an aspect of the remotely adjustable audio-visual recording device corresponding to the feature.

* * * * *